J. DOUGHERTY.
MANNER OF CONSTRUCTING CANAL BOATS SO THAT THEY CAN BE TRANSFERRED ONTO RAILROAD CARS.
No. 2,973.    Patented Feb. 24, 1843.
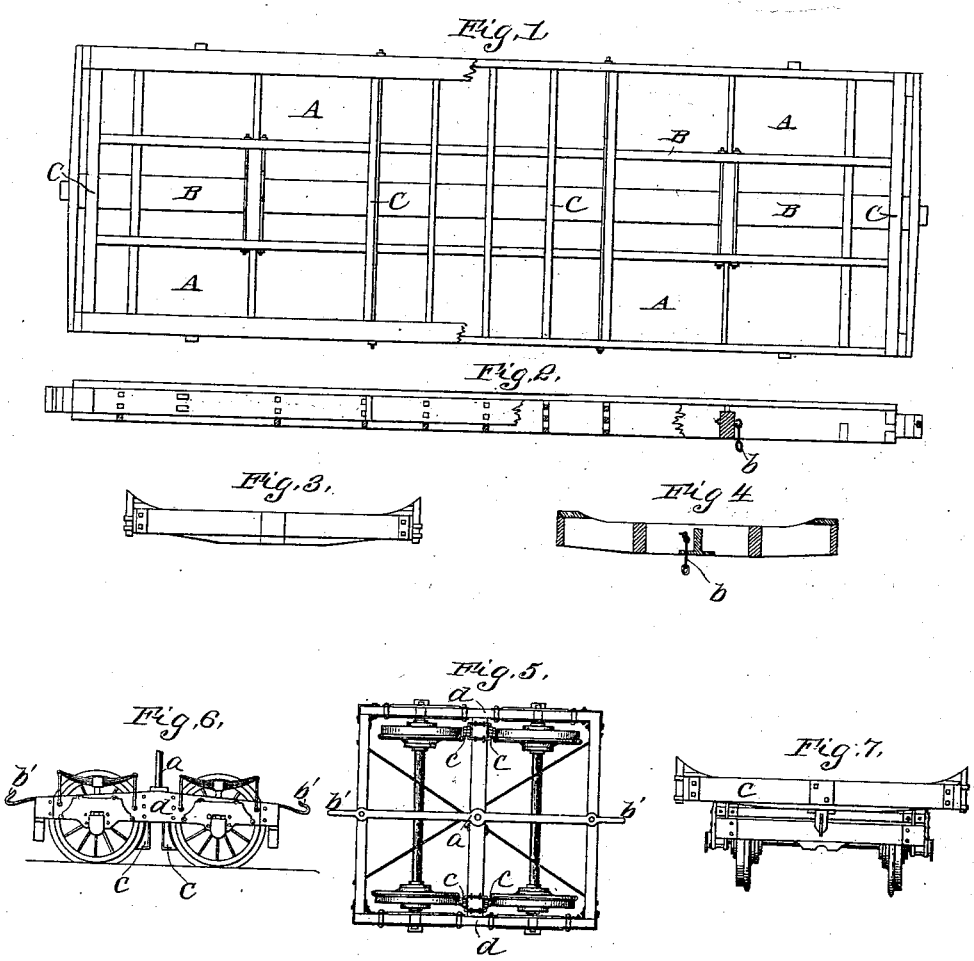

ized whilst their boats are to be considered as available for canal navigation.

UNITED STATES PATENT OFFICE.

JOHN DOUGHERTY, OF HOLLIDAYSBURG, PENNSYLVANIA.

MANNER OF CONSTRUCTING CANAL-BOATS SO THAT THEY CAN BE TRANSFERRED ONTO RAILROAD-CARS.

Specification of Letters Patent No. 2,973, dated February 24, 1843.

*To all whom it may concern:*

Be it known that I, JOHN DOUGHERTY, of Hollidaysburg, in the county of Huntingdon and State of Pennsylvania, have invented certain improvements in the apparatus for the transportation of goods on canals and rail-roads; said improvements consisting in a more perfectly carrying out of the method of transportation for which Letters Patent of the United States were granted to John Elgar, dated on the 7th day of November, 1835, and of which I am the assignee for the State of Pennsylvania; and I do hereby declare that the following is a full and exact description of my said improvements.

In the car boxes, which also constituted sectional parts of canal boats, as constructed by the above named John Elgar, the bottoms of said boxes were made flat, and when transferred from a canal they were placed upon either four, or eight, wheeled cars, the wheels of which revolved under the platform, or frame, upon which the boxes were sustained. The consequence of this arrangement was that unless the wheels were made of so small a diameter as to destroy their utility, the car boxes were elevated to such a height above the rails as to render it necessary to lessen their own height in a corresponding degree, in order that they might pass under the bridges, or through the tunnels, by which the entire elevation of the vehicle is determined. I construct the eight-wheeled cars upon which said boxes, or sectional parts of boats, are to be carried, so as to allow the wheels to pass up through the frame, or cradle, upon which such sectional canal-boat, or car-box, rests, when running upon a rail-road. The bottoms of my boats, or boxes, I usually form bulging, or convex, in their cross section, in the manner in which such boats are ordinarily made; but they may be made flat, and the frame, or cradle, on which they rest, adapted thereto; there is a gain, however, of some inches by making them somewhat convex, and I therefore prefer this form.

In the accompanying drawing, Figure 1, is a top view of the cradle, or frame, without the sectional boat, or box, which is to be carried. Fig. 2, is one of the side timbers thereof. Fig. 3, and 4, are side views of two of the cross timbers of said frame. Fig. 5, is a top view of one of the four-wheel trucks, of which there are to be two, converting the vehicle into an eight-wheel car. Fig. 6, is a side view of one of the trucks; Fig. 7, an end view of a truck and of the cradle thereon.

In constructing the cradle it is necesary to limit its width to about eight feet, nine inches; the passing along the road forbidding that this width should be exceeded; it is necessary, also, that the cars should be capable of running upon curves of fifty, or sixty feet radius. The truck wheels which I use are about two feet nine inches in diameter; and instead of being kept to the level of the upper sides of the side pieces of the truck frame, as formerly, they are allowed to rise about a foot above them, as shown in Fig. 6, and to occupy the spaces A, A, provided therefor in the cradle, Fig. 1. The longitudinal timber B, B, may in this case be a foot in depth; and the width of the spaces A, A, must be such as, but need not be greater than, will admit of the trucks adopting themselves to the curves of fifty, or sixty feet radius, as above named. The trucks work on center bolts $a$, $a$, as usual.

$b$, $b$, are links which connect the frames of the trucks with the frame work of the cradle, by means of hooks $b^1$, $b^1$, or otherwise.

$c$, $c$, are brakes to check the motion of the wheels. The side pieces $d$, $d$, of the trucks are about a foot in width. The cross timbers C, C, of the cradle are on their upper sides, adapted to the form of the bottom of the boat.

The boats, or boxes, may be made of sheet metal, or of wood; or their lower portions may be of metal, and their upper of wood; the invention not being in any way dependent upon the kind of material employed. I connect these boats, or boxes, together, when they are used on canals, in such manner as that there shall be two sections in width, and three, or more, in length. In this respect, my plan of connecting the sections is not the same with that adopted by Mr. John Elgar who proposed to connect them in a continuous line, and in such manner as that they should possess a certain degree of flexibility at the places where they were joined to each other; but when so joined, they have not been found to operate well, as they cannot be kept with their sides and bottoms coincident, but vary laterally, as well as upward and downward; from which cause they are liable to be injured by snags, or rocks, and have their motion retarded by the water. A still more frequent difficulty resulting from the original mode of connecting them, has arisen from the want of a free passage of the towing lines from end to end of the boat; all of which objections I obviate by attaching to the fore end of each section, which is to have a rear section joined to it, a plate of iron six, or eight inches, more or less, in width, and of such length as that it shall extend entirely across the under part of the section, from side to side, and sufficiently high on each side to confine the two parts, or sections, in place. Such plates are to be bent so as to conform to the curvature of the bottom, are to be fastened to one of the segments by bolts, or otherwise, and to project over and form a ledge, say two-thirds, more or less, of their width, so that the rear section may be received, and rest, upon it. The sections are then to be firmly secured end to end, by loops and keys, or in some analogous mode, until the intended length is obtained; and two such series of sections are to be secured by bolts, bars, or clasps, side by side, and are thus to constitute a combined boat, of the ordinary width of a canal boat, and in length adapted to the locks through which they are to pass.

Fig. 8, shows a side view of four sections so combined; the rear one of these sections may be adapted to the occupation of passengers and the hands, if desired; $e, e,$ are the plates of iron by which the sections are kept in a line with each other; $f, f,$ are keyed bolts, by which the respective ends are drawn, and kept, together.

Fig. 9, is a top view of a double series of sections, bolted, or keyed, together at $g, g.$ At that part which constitutes the stern, there may be two rudders moved by one tiller, as shown in Fig. 10; or one rudder may be placed between the two sections.

Having thus, fully described the nature of my improvements on the apparatus for the transportation of goods upon canals and rail-roads

What I claim therein as new, and desire to secure by Letters Patent, is—

The employment of plates of iron, in the manner described, where two such sections connect with each other, so that one of the sections may be received upon the projecting part of said plate, and the two parts be thus kept correctly in place, when secured together by the keyed bolts, or by any analogous device.

JOHN DOUGHERTY.

Witnesses:
 THOS. P. JONES,
 JOHN HITZ.